March 23, 1926. 1,578,103
A. G. SUTTILL ET AL
BLOCK MOLDING MACHINE
Filed August 21, 1924  2 Sheets-Sheet 1
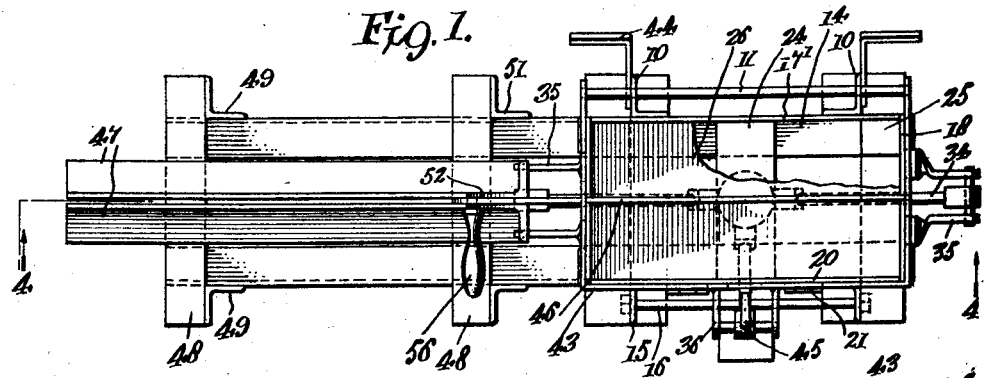
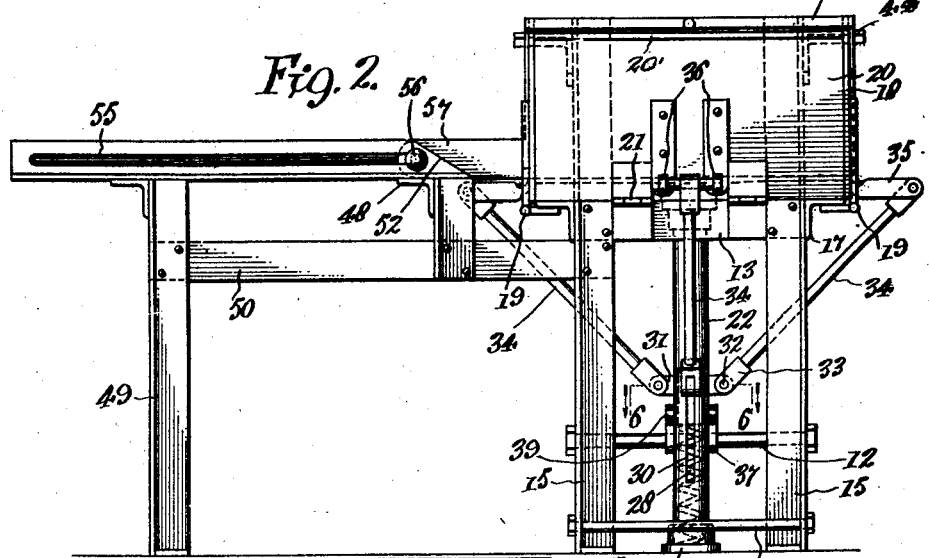
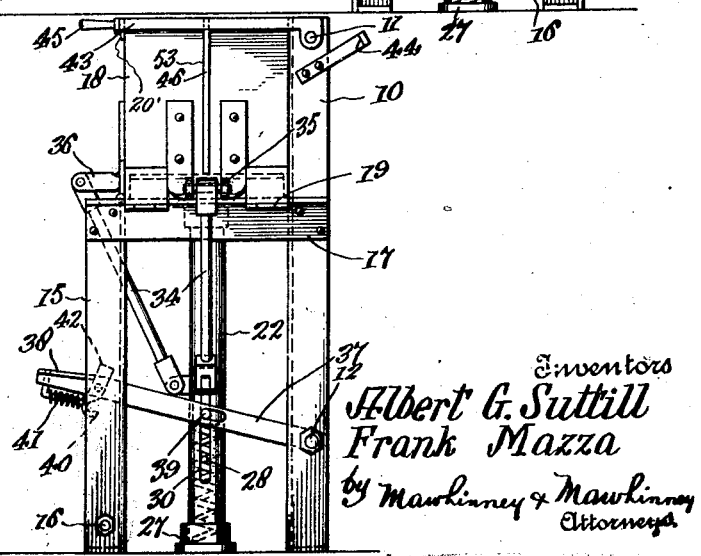
Inventors
Albert G. Suttill
Frank Mazza
by Mawhinney & Mawhinney
Attorneys March 23, 1926. 1,578,103
A. G. SUTTILL ET AL
BLOCK MOLDING MACHINE
Filed August 21, 1924   2 Sheets-Sheet 2

Inventors
Albert G. Suttill
Frank Mazza
by Mawhinney & Mawhinney
Attorneys

Patented Mar. 23, 1926.

1,578,103

UNITED STATES PATENT OFFICE.

ALBERT G. SUTTILL, OF BELMONT, AND FRANK MAZZA, OF CAMBRIDGE, MASSACHUSETTS, ASSIGNORS OF ONE-THIRD TO ALBERT PASQUALI, OF WATERTOWN, MASSACHUSETTS.

BLOCK-MOLDING MACHINE.

Application filed August 21, 1924. Serial No. 733,347.

*To all whom it may concern:*

Be it known that ALBERT G. SUTTILL and FRANK MAZZA, citizens of the United States, residing at Belmont and Cambridge, respectively, both in the county of Middlesex and State of Massachusetts, have invented certain new and useful Improvements in a Block-Molding Machine, of which the following is a specification.

The present invention relates to molding apparatus and more particularly to a machine adapted for use in molding blocks and the like for building purposes.

An object of the present invention is to provide a machine of this type which is capable of molding two or more blocks at a time; a machine which is provided with walls capable of being swung down from each other to open the mold and which are arranged to accommodate a partition or partitions; the structure being such that the walls and the one or more partitions used may be interlocked securely together into a rigid structure when the mold is closed to permit the filling and tamping operations without disturbing the positions of the walls and the partitions.

Another object of the invention is to provide a block molding machine having mechanically operated means for simultaneously opening and closing the walls and which embodies improvements in structure for maintaining the walls in open and closed positions and for facilitating actuation of the mechanical means by the foot, and wherein the walls of the machine may be independently and separately hinged to the frame.

A further object of the invention is to provide an improved locking clamp for engaging the walls and the one or more partitions.

A still further object of the invention is to provide a construction of block molding machine adapted to accommodate a pallet which is adjustable for molding blocks of different sizes as to the depth of the concrete blocks, and which is adapted to support the pallet in such position that it may be easily removed and positioned with respect to the mold box.

The invention further aims to provide a block molding machine of relatively simple construction and which may utilize angle iron in the frame part to obtain rigidity in the structure and so as to ably support the back plate in a rigid and firm position for determining the correct adjustment and positioning of the other parts of the machine which are relatively movable with respect to the back plate.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a block molding machine constructed according to the present invention.

Figure 2 is a front elevation of the same.

Figure 3 is an end elevation of the block molding machine.

Figure 4:
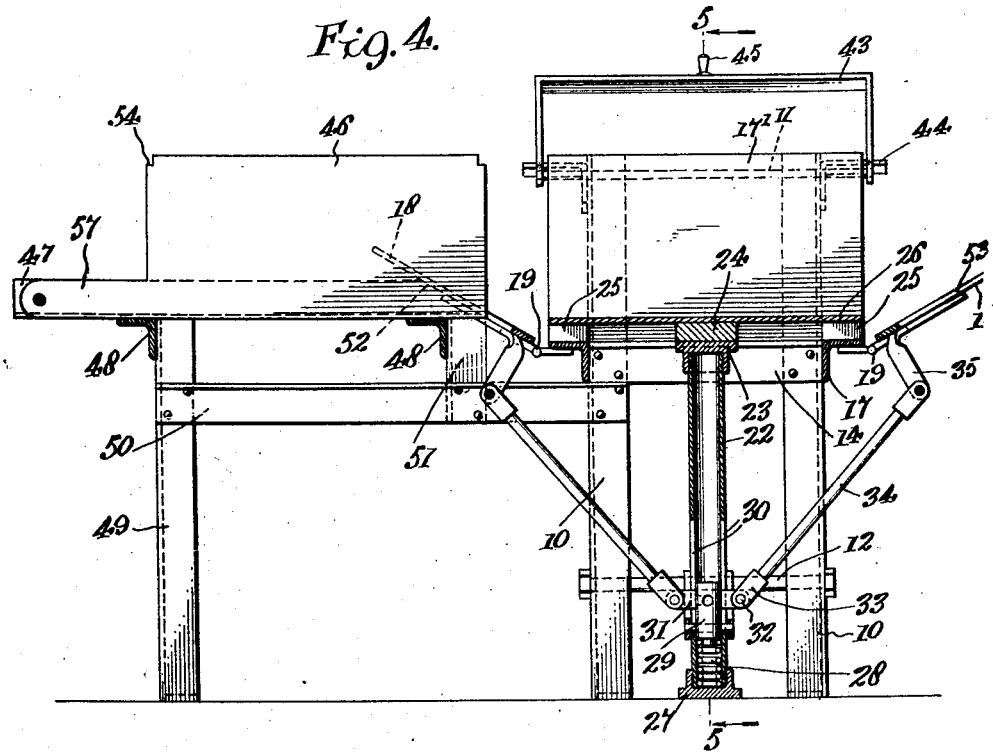
Figure 4 is a vertical longitudinal section taken centrally through the machine substantially on the line 4—4 of Figure 1.

Referring to the drawings the block molding machine comprises a frame having rear angle iron uprights 10 suitably spaced apart with longitudinally alining flanges and with their other flanges projecting rearwardly from the body of the machine.

These uprights 10 are interbraced at their upper ends by a cross rod 11 and at their lower ends by a cross rod 12, the latter being spaced a short distance above the lower ends of the uprights 10. The uprights 10 also carry front and rear cross pieces 13 and 14 of angle iron construction and which are arranged with depending vertical flanges riveted or otherwise suitably secured across the longitudinally alining flanges of the uprights 10 and the corresponding flanges of front legs 15 which carry the cross piece 13. The lower ends of the legs 15 are reinforced by a cross rod 16 which is secured to the legs for spacing the same apart. The legs 15 terminate at their upper edges substantially in a horizontal plane of the cross pieces 13 and 14, and the latter form the bottom support of the mold box of the machine.

The frame is further reinforced and made rigid by end pieces 17 of angle iron construction and which are secured across the out turned flanges of the uprights 10 and legs 15, the end pieces 17 having horizontal flanges which lie substantially in the horizontal plane of the cross pieces 13 and 14 and which project outwardly from the ends of the frame.

Figures 5, 6, 7:
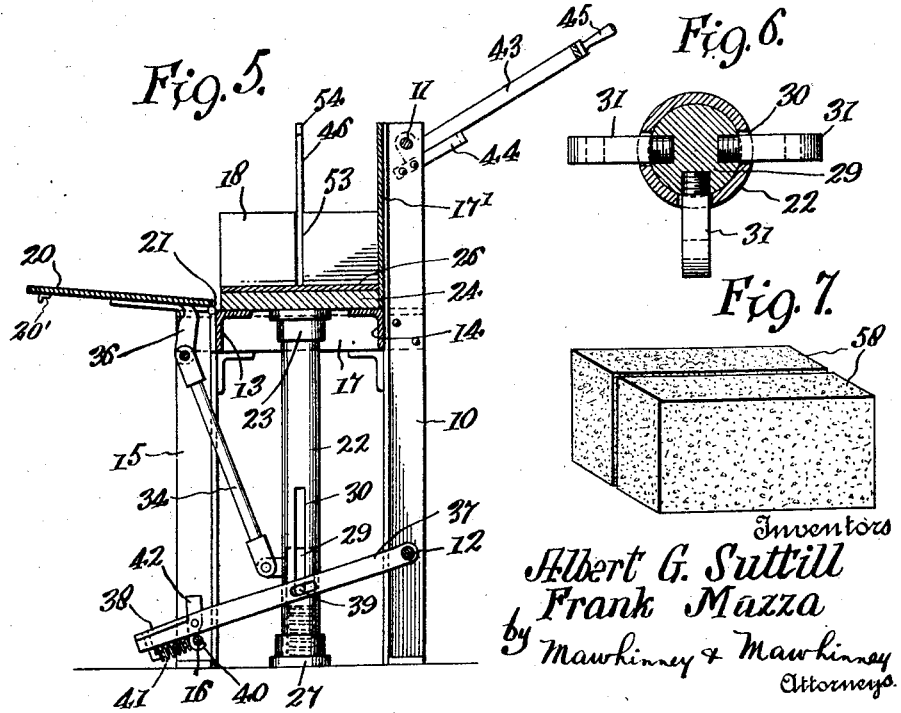
Figure 5 is a transverse section taken through the machine at the mold box, substantially on the line 5—5 of Figure 4.
Figure 6 is a transverse section, enlarged, through the lower end of the center post taken substantially on the line 6—6 of Figure 2.
Figure 7 is a perspective view of a pair of blocks in their relative positions as formed in the frame.

The uprights 10, above the bottom of the mold box are provided with a back plate 17' which is preferably of steel tank plate instead of the usual cast iron construction, and this back plate 17' is suitably secured across the upper ends of the uprights 10 to form not only the back of the mold box, but also a reinforcement and rigid portion of the machine relatively to which the other parts may be moved and adjusted. The frame is provided at each end with a wall or door 18 which is similarly formed to the back plate 17' but which is connected to the outstanding horizontal flange of the adjacent end piece 17 by a hinge 19 which admits of the swinging of the end wall 18 up into position against the back plate 17 as shown in Figures 1, 2 and 3, and the swinging of the end wall 18 into open position as shown in Figures 4 and 5. There is one of these end walls 18 at each end of the mold box and a front wall 20 of similar construction is mounted by means of a hinge 21 to the front cross piece 13, so that the front wall 20 may be swung into upright position opposite the back plate 17' or may be swung down into substantially horizontal position as shown in Figure 5 for supporting the molded articles when they are first removed from the machine.

Arranged substantially centrally within the frame and beneath the mold box, is a center post 22 provided with a cap 23 upon its upper end arranged to support an adjusting strip 24 adapted to cooperate with corner blocks 25 placed upon the horizontal outturned flanges of the end piece 17 to support a steel pallet 26 upon which the molded articles are made. The steel pallet 26 comprises the bottom of the mold box and may be elevated to the desired extent by strips 24 and blocks 25 of the required thickness. The height of the molded blocks may thus be adjusted or changed to suit conditions in the finished article.

The post 22 has a foot piece 27 adapted to rest on the ground, and the post 22 is hollow for housing and projecting a spring 28 the lower end of which is seated in the foot piece 27 while its upper end is fitted against a vertically slidable block 29 freely fitted in the post 22. The post 22 is provided with lateral and front vertical slots 30 into which project pivot eyes 31 with threaded shanks, the shanks being screw threaded into suitably formed and threaded apertures in the corresponding sides of the block 29. The pivot eyes 31 are transversely apertured in their outer ends beyond the post 22 for receiving pivot pins 32 carried in forks 33 mounted on the lower ends of connecting rods 34 which extend upwardly to the end walls 18 and the front wall 20 respectively.

Each end wall 18 has a relatively long arm 35 projecting outwardly at substantially right angles to its respective wall 18 and which are pivotally connected to the upper ends of the connecting rods 34. The arms 35 are relatively long so that the predetermined movement of the block 39 in the post 22 effects a corresponding but slower movement of the end walls 18 so that the latter when fully opened do not swing through an entire 90 degrees and are maintained in the upwardly inclined positions shown in Figure 4 when the mold box is opened.

The front connecting rod 34, however, is pivotally connected to a relatively short arm 36 which extends outwardly and substantially at right angles to the front wall 20 but which is shorter than the arms 35, so that by the same movement of the block 29, the end wall 20 is swung through substantially a complete 90 degrees from a vertical into a horizontal position as shown in Figure 5. This difference in the lengths of the arms 35 and 36 also facilitates the inter-fitting of the end and front walls 18 and 20 for opening and closing the mold box with the least possible resistance and also to effectively seal the corners or edges thereof.

The spring 28 normally urges the block 29 upwardly to normally close the mold box. To facilitate opening of the mold box quickly and with a single movement of the foot, a treadle 37 is pivoted upon the rear lower cross rod 12 and comprises a pair of bars adapted to lie at opposite sides of the center post 22 and which are connected together at their forward ends by a tread strip 38 secured across the upper edges of the bars 37 for connecting the same in a substantially one-piece treadle structure.

The block 29 carries a cross pin 39 which projects beyond the opposite sides of the center post 22, and through the lateral slots 30 thereof. The pin 39 at its opposite ends engages in elongated openings or slots formed in the intermediate parts of the strips of the treadle 37. This arrangement permits of the housing of the spring 28, so that it cannot be hindered in operation or injured by the cement and other material which is dropped from the mold box and thereabout during the filling, tamping and removing operations.

In order to maintain the block 29 in lowered depressed position, and hold the mold box open, the treadle 37 is provided near its outer end with a pivoted hook 40 arranged with its bill inclined and lying in the path of the front lower cross rod 16, so that the latter may engage the bill of the hook and deflect it forwardly to admit the complete lower swinging movement of the treadle 37. The hook 16 is normally urged to swing rearwardly at its lower end by a spring 41 to engage the hook about the lower side of the cross rod 16 and effect the interlocking of the hook therewith for holding the treadle 37 down. The hook 40 has on its upper end a projection or lug 42 adapted to be struck by the foot for compressing the spring 41 and releasing the hook 40 from the rod 16, so that the treadle 37 will swing upwardly under tension of the spring 28.

A locking clamp 43 is employed for securing the end and front walls in raised position to complete the mold box and hold the walls from separating when subjected to internal pressure. This clamp 43 preferably comprises a U-shape strip or bar which is pivotally mounted at its free ends on the opposite extremities of the upper cross brace 11 carried by the uprights 10, and the side pieces of the clamp 43 are of sufficient length to permit the clamp to extend over the upper edge of the front wall 20 and across the front side thereof to lock the front wall in position. The front wall 20 is provided across its outer face, and in spaced relation to its upper free edge, with a combined bracing and stop bar 20' which may be of angle iron construction as shown and which is secured to the front wall 20 with a horizontal outstanding flange at its upper edge arranged to receive the cross bar of the clamp 43 to limit its downward movement when locked. This outstanding horizontal flange also serves as a brace to prevent the bending or bulging of the front wall 20 incident to internal pressure or the like. The clamp 43 may be held in an inclined position when open, as shown in Figures 4 and 5, by a pair of rests 44 which are riveted or otherwise suitably secured to the rearwardly extending flanges of the uprights 10 and which are drawn toward the opposite ends of the machine to engage across the rear edges of the clamp 43 when it is swung backwardly out of the way. The clamp 43 may have a handle 45 at its intermediate portion to facilitate the swinging of the clamp down into position, and the elevating of the clamp with one hand.

The mold box may be divided into two or more compartments by one or more partitions 46 arranged to slide lengthwise of the machine and into and out of one end of the mold box. The sliding partitions 46, one being shown in the present illustration, are held rigidly in position after they are fully inserted through one of the end wall slots, by engagement of the one or more slides in their respective slots formed in the opposite end of the mold box so that the partitions are held rigidly from moving toward and from the front and rear walls of the mold box. Therefore the material may be tamped on one side of the partition only without displacing the partition and unevenness in pressures at opposite sides will not displace the partitions. The partition 46 comprises a plate which is slidably fitted between a pair of spaced rails 47 which are secured across angle bars 48 across which the plate 46 slides. The bars 48 are spaced apart lengthwise of the machine, the outermost bar 48 being secured to a pair of uprights 49 also of angle iron construction and which are secured to front and rear braces 50, the latter being attached at their inner ends to the adjacent front leg 15 and upright 10 respectively.

The inner cross bar 48 is secured to the upper ends of short bars 51 which are carried upon the intermediate portions of the braces 50. The inner ends of the rails 47 are beveled as at 52 to accommodate the adjacent end wall 18 when the latter is swung down into open position as shown in dotted lines in Figure 4. The end walls 18 are both provided with vertical intermediate slots 53 of sufficient size to freely admit the passage of the partition 46 therethrough, so that after the mold box is closed the partition 46 may be slid into place, and the partition has at its upper corners notches or recesses 54 for receiving the side portions of the clamp 43 when the latter is lowered. The clamp 43 thus locks the partition 46 as well as securing the movable walls of the mold in fixed relation.

One of the longitudinal rails 47, such as the front rail, is provided with a longitudinal slot 55 through which projects a handle 56 secured to an arm 57 projecting outwardly from the lower end of the partition plate 46. The handle 56 may be employed for sliding the partition plate 46 into and out of the mold box.

In the use of this block molding machine, the doors or walls 18 and 20 are swung down into open position as shown in Figures 4 and 5 and held in such position by the latch 40. At this time the partition 46 is disposed outside of the mold box as shown to advantage in Figure 4 and is supported upon its bracket or runway at the left end of the machine. The steel plate pallet 26 is now positioned in the bottom of the mold, and the latch 40 is released so that the spring 28 is free to close the doors or side walls of the mold box. The latch or bail 43 is now swung down about the upper edge portions of the closed walls for locking the same together and preventing their separation when the interior of the box is subjected to pressure.

Prior to the closing of the latch or clamp 43 the partition 46 is slid into place by manipulation of the handle 56 so as to divide the molding chamber into front and rear compartments of the desired size for molding the blocks, such as shown in Figure 7. While the present illustration discloses a block molding machine with but one partition and facilities for molding but two blocks as shown in Figure 7 it is of course understood that the partitions may be increased to any desired number within practical limits and that other slight modifications may be made in the mold box structure for accommodating the number of partitions used so that any desired number of blocks may be made in one operation of the machine. The notches 54 of the partition plate 46 receive the lateral portions of the clamp 43 when it is closed so that the partition plate 46 is also held against edgewise sliding movement out of place.

The mold is now ready to receive the concrete or other cementitious material. The material to be molded is poured or otherwise suitably placed in the compartments of the mold box and tamped or otherwise suitably packed into place so as to close the pores and closely adhere to the interior faces of the mold and also provide a homogeneous and compact mass. After this is done and the material is sufficiently set, the clamp 43 is raised, the partition 46 is then slid out of the mold chamber, and the treadle 37 is forced down and locked to open and maintain in open position the doors or hinged walls.

The machine is now adjusted for the removal of the steel pallet 26 and it may then receive a second pallet for subsequent molding. In this manner the blocks need not be removed from the pallets until a final operation and the pallets may be readily removed and substituted incident to the peculiar mounting and operation of the doors or walls.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a block molding machine, a frame, a mold box mounted on the frame and including a solid back plate, a partition mounted on the frame and slidable in parallel relation to said back plate, said mold box having a slot in one end for receiving said partition, and means for sliding said partition into and out of the mold box.

2. In a block molding machine, a frame, a mold box mounted on the frame and having hinged front and side walls and a solid back plate, operating means for swinging said hinged walls into open and closed positions, and a partition mounted on said frame and slidable in parallel relation to the back plate, one of said end walls having a slot therein and said partition adapted to be moved into and out of the mold box through said slot.

3. A block molding machine comprising a frame, a mold box on the frame having hinged front and side walls and a solid back plate, operating means connected to the hinged walls for swinging the same into open and closed positions, a movable pallet mounted in the bottom of the mold box, and a partition mounted on the frame for movement into and out of the mold box in parallel relation to the back plate.

4. A block molding machine comprising a frame, a mold box mounted on the frame, slots arranged in the opposite ends of the mold box, and a partition slidably mounted on the frame adapted to enter said slots for dividing the mold box in the compartments, said end walls being arranged to receive the opposite end portions of the partition in the slots for maintaining the partition in position.

5. A block molding machine comprising a frame, a mold box mounted on the frame and having hinged walls, a treadle device carried by the frame connected to said walls for opening and closing the same, a partition slidably mounted on the frame adapted to be moved into and out of the mold box, and clamping means engageable with said movable walls and with said partition for interlocking the same in closed positions to secure the walls and partitions in place.

6. A block molding machine comprising a frame, a back plate rigidly mounted on the frame, end and front walls hinged at their lower portions to the frame adapted to be moved up into position relatively to the back plate to provide a mold box, said end walls having vertical slots therein, a partition carried by the frame adapted to be fitted through said slots for dividing the mold box in the compartments, and a locking clamp pivotally mounted on said back plate adapted to be swung downwardly over said walls and said partition when closed to secure the same together.

7. A block molding machine comprising a frame, a back plate rigidly mounted on the frame, a locking clamp pivoted on the back plate, end and front walls hinged at their lower portions to the frame and adapted to be swung up to form a mold box in front of the back plate, a partition removably mounted in the mold box for dividing the same in the compartments, said walls and said partition being adapted to receive said clamp thereover for locking the parts in closed position, a removable pallet fitting in the bottom of the mold box, and interchangeable blocks carried by the frame between said walls for supporting said pallet at the desired height in the mold box.

8. A block molding machine comprising a frame, a mold box on the frame having hinged end and front walls, a post arranged in the frame beneath the mold box, a vertically movable member in the post, rods connecting said vertically movable member with said walls for swinging the same into open and closed positions by movement of said member, a treadle connected to said member for depressing the same to open said walls, and a spring in the post engaging said member for normally urging the same in a direction to close said walls.

9. A block molding machine comprising a frame, a mold box on the frame having hinged front and end walls and a solid back plate, a vertically movable member beneath the mold box in the frame, a treadle for depressing said member, connections between said hinged walls and said member for simultaneously opening and closing the walls upon the depression and raising of the member, means for releasably locking said member when depressed to hold the walls in open position, and means actuating on the member to raise the same and simultaneously close the walls upon the release of said locking means.

10. A block molding machine comprising a frame, a back plate rigidly mounted on the frame, a U-shaped clamp hinged upon the back plate, end and front walls hinged at their lower portions upon the frame and adapted to be swung up in front of the back plate to provide a mold box, said clamp being adapted to be swung down over the upper portions of said walls to lock the same in closed position, a partition mounted on the frame adapted to be moved into the mold box, said partition having notches at its upper corners adapted to fit within said clamp for locking the partition in position, a removable pallet in the bottom of the mold box, and means for opening and closing said walls when released by said clamps.

In testimony whereof I affix my signature.
ALBERT G. SUTTILL.
FRANK MAZZA.